MICHAEL A. BENNING
ALAN H. SINGLETON
INVENTORS

BY *James C. Simmons*
ATTORNEY

United States Patent Office 3,630,956
Patented Dec. 28, 1971

3,630,956
METHOD OF PRODUCING GASES WITH CONTROLLED CONCENTRATIONS OF WATER VAPOR
Michael A. Benning, Allentown, and Alan H. Singleton, Emmaus, Pa., assignors to Air Products and Chemicals, Inc., Allentown, Pa.
Filed Apr. 1, 1969, Ser. No. 812,246
Int. Cl. C09k 3/00; C01b 5/00; B01j 11/08
U.S. Cl. 252—372                                     12 Claims

ABSTRACT OF THE DISCLOSURE

Processes are disclosed for the preparation of gas mixtures having a stable, controlled content of water vapor. The invention is characterized by the catalytic conversion to water of accurately determined quantities of hydrogen and oxygen contained in the gas to be humidified. The processes are suitable for use in both cylinder and pipeline transportation of gases.

BACKGROUND OF THE INVENTION

This invention is directed, in the broad sense to gases containing a controlled amount of water vapor and to methods for producing such gases or mixtures of gases. The process is based upon the catalytic reaction of hydrogen and oxygen in a controlled manner to produce precise amounts of water vapor in a given volume of a carrier gas.

It has long been recognized that gas mixtures having a controlled moisture content have been needed as medicinal gases, in synthetic breathable atmospheres, as calibration and reference standards for industrial gases, in reaction systems activated by controlled amounts of water (e.g. hydrogen alkylation processes), as well as gases supplied to fuel cells which need to be maintained at controlled humidity levels.

These needs have, at best, been met only in part by drying cylinder gases to a stable low moisture content. However, the saturated water capacity of a gas stored at the pressures (100 to 200 atmospheres) typically used in gas storage cylinders seriously limits the upper limit of water concentrations achievable in stored water vapor gas mixtures.

When it has been necessary to humidify dry gases, difficulties are encountered due to the selective adsorption of added moisture on the walls of the container. This causes the first portion of the stored gas withdrawn from the cylinder to have a low water vapor concentration. As more gas is withdrawn from the cylinder and the pressure falls, water vapor is continuously desorbed from the walls so that the water vapor concentration in the gas gradually increases. Water vapor concentration in the gas varies depending upon gas pressure, withdrawal rate and temperature of the cylinder walls.

SUMMARY OF THE INVENTION

In view of the above-described problems, we have discovered that when a dry mixture of a gas containing measured amounts of hydrogen and oxygen is prepared and then passed over a suitable catalyst, the hydrogen and oxygen can be combined to form water in the carrier gas. Alternatively, a mixture of a predetermined amount of hydrogen and a reducible source of oxygen in a carrier gas can be passed over a suitable catalyst to achieve the same result. It is also possible and may in some cases be desirable, to combine the above methods to achieve the desired water content in a gas or gas mixture.

Therefore, it is the primary object of this invention to provide a method for introducing controlled amounts of water vapor into a given quantity of a gas.

It is another object of this invention to provide a method for producing a controlled amount of water vapor in a carrier gas by reacting measured amounts of hydrogen, and an oxidizing agent contained in the gas.

It is still another object of this invention to provide a method for continuously supplying a carrier gas with predetermined and controlled water vapor content.

It is a further object of this invention to provide a carrier gas with a controlled quantity of water vapor by the catalytic reaction of hydrogen and oxygen.

These and other objects will become apparent to those skilled in the art from the following description of our invention.

BRIEF DESCRIPTION OF THE DRAWING

FIG. 1A illustrates a system for charging a gas pressure cylinder.

FIG. 1B illustrates a system for withdrawing a gas stream from the cylinder of FIG. 1A and passing the gas through a catalyst reaction chamber.

DETAILED DESCRIPTION OF THE PREFERRED EMBODIMENTS

Figure 2:
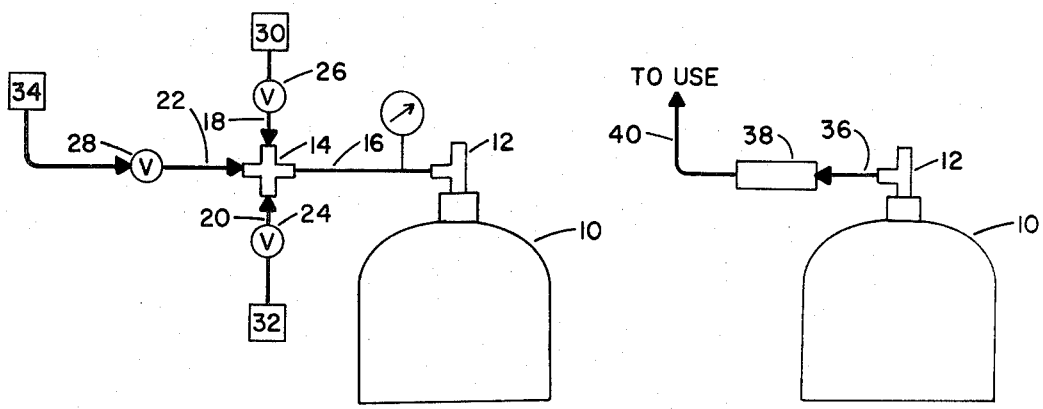
FIG. 2 represents a system wherein gas streams are mixed and passed through a catalyst reaction chamber continuously.

Referring to the drawings, there is shown in FIG. 1A a gas storage (pressure) cylinder 10. Such cylinders are well known to the art. Mounted on cylinder 10 is a head valve 12 for controlling the input and output of the cylinder 10.

A schematic representation of an apparatus for charging the cylinder 10 is shown in FIG. 1A. Conduit 16 connects valve 12 on cylinder 10 to manifold member 14. Member 14 is in turn connected by conduit 18 through valve 26 to a source of hydrogen 30, by conduit 20 through valve 24 to a source of oxygen 32, by conduit 22 through valve 28 to a source of a carrier gas 34. The term carrier gas is used to denote that gas into which a controlled amount of water vapor is to be introduced. The carrier gas can be any gas that will not react spontaneously with either oxygen or hydrogen. The sources of hydrogen 30, oxygen 32, and carrier gas 34 can be cylinders, pipelines or tanks.

Mixing of the gas is a technique known to the art. However, the gas mixture must be composed of gases that have been previously dried of moisture. Drying techniques for gases are also well known to the art.

In the practice of the inventive concept, either the hydrogen or the oxygen will be added in stoichiometric excess. According to the equation $2H_2 + O_2 = 2H_2O$, stoichiometric amounts of hydrogen and oxygen in the presence of a suitable catalyst will completely react to form water vapor. However, it is extremely difficult, if not impossible, to blend hydrogen and oxygen in a carrier gas in exactly stoichiometric amounts. The one gas being present in stoichiometric excess then assures that the quantity of water vapor produced in the carrier gas will be determined by the quantity of the reactant not in excess. In other words, if the molar concentration of hydrogen is known and an excess quantity of oxygen is added to the gas the water concentration water vapor to be produced in the carrier gas will equal the molar concentration of hydrogen introduced into cylinder 10. If hydrogen is in excess the molar concentration of water vapor formed will be twice the molar concentration of oxygen. Reference to quantity of reactants or water vapor should hereinafter be taken to mean molar concentrations.

As stated above, precise amounts of gases can be mixed and gas mixtures can be precisely determined by known analytical techniques. Therefore, by determining the concentration of hydrogen or oxygen in the carrier gas the water vapor concentration in the gas, after catalytic reaction as will be subsequently described, can be fixed.

Having thus provided cylinder 10 with a mixture of hydrogen, oxygen, and a carrier gas such as nitrogen it is now possible to withdraw from cylinder 10 the carrier gas (e.g. nitrogen with a predetermined quantity of water vapor as shown in FIG. 1B. In order to withdraw the nitrogen from cylinder 10 into conduit 40, and, at that stage have the nitrogen contain a predetermined quantity of water vapor, the gas mixture in cylinder 10 must pass through valve 12 through conduit 36 into catalytic reaction chamber 38 and then into conduit 40. As the gas passes through chamber 38 it is passed over a suitable catalyst to synthesize water directly from hydrogen and oxygen. The stream of gas issuing into conduit 40 will then contain the carrier gas (nitrogen), water vapor, and the initial excess of hydrogen or oxygen. It will be seen later that further embodiments of the invention can be used to produce a humidified gas without an excess of hydrogen or oxygen.

The catalyst contained in chamber 38 can be any known material that will cause hydrogen and oxygen to react to form water. We have found that a commercial catalyst known under the trademark "Nixox," manufactured by the Houdry Process and Chemical Company, is particularly effective for our invention. The "Nixox" catalyst is nominally palladium supported on kaolin. We have found that the amount of supported catalyst must be controlled so as to be present only in that quantity necessary to react the $H_2$ and $O_2$. If an excess of supported catalyst is present, we have found some water vapor is absorbed by the support. Controlling the amount of support surface available will minimize the absorption phenomena.

Alternatively, it is possible to use an unsupported platinum-rhodium catalyst in finely divided form to cause the reaction. A fine screen made from the known platinum-rhodium catalytic alloy would yield satisfactory results. Palladium, iridium and alloys thereof can also be used effectively in this form.

The embodiment according to FIGS. 1A and 1B has a drawback in that over a prolonged period there would be a slow reaction between $H_2$ and $O_2$ yielding water in cylinder 10. It is thought that the cylinder walls act as a catalyst to cause this reaction. It also may be that once the initial reaction takes place the water vapor may act as a catalyst. This can be avoided by lining the cylinder walls with inert non-metallic materials such as poly(tetrafluoro ethylene).

There is shown schematically in FIG. 2 a method for continuously supplying a carrier gas (e.g., nitrogen) with a predetermined quantity of water vapor. The method of FIG. 2 employs a mixing and piping arrangement similar to FIG. 1A. Those portions of FIGS. 2 and 1A having similar parts have similar reference numbers with a prime notation. One major difference is that the product of member 14' goes not to storage but directly to a catalytic reaction chamber 38', similar to the reaction chamber of FIG. 1B, and issues into conduit 44 as a carrier gas with controlled water vapor. Another difference is that a small portion of the product of member 14' is continuously passed into gas analyzers 42 and 43 for determination of the reactant concentrations. The gas stream must be analyzed so that one of the reactants (hydrogen or oxygen) can be added to the catalytic chamber 38' in the quantity equal to the desired water vapor content and the other added in excess. The valves 24', 26', and 28' then can be used to control the amounts of hydrogen and oxygen in the gas stream issuing from member 14'. This assures both the precise gas quantity and the excess gas are present as needed.

The catalytic reaction is the same when a mixture of dry oxygen, hydrogen and carrier gas in precise amounts is sent into chamber 38'. That is to say, for these mixtures the supported or unsupported platinum-rhodium or palladium catalyst can be used.

As shown in FIG. 2 the source of gases 30', 34', and 36' can be pipelines, cylinders or tanks. The flow rate of each gas can be balanced by using a supply of the carrier gas with hydrogen and a supply of the carrier gas with oxygen in place of sources of pure hydrogen and pure oxygen.

It would also be possible to use an analyzer (not shown) at the exit end of the chamber 38' to establish the flow of one reactant (e.g., hydrogen) equal to the desired water vapor content, and then adding the other reactant (e.g., oxygen) until the hydrogen level at the exit end of the catalyst chamber was zero. Analyzers 42 and 43 could still be useful to maintain the gas balance by monitoring both hydrogen and oxygen content before entering the chamber 38'.

Figure 3:
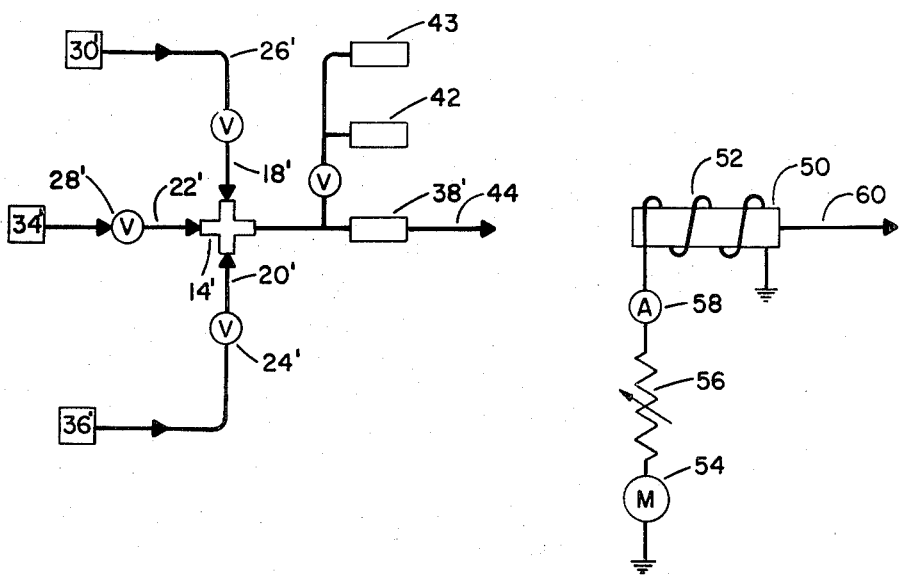
FIG. 3 represents an externally-electrically heated reaction system.

There is shown in FIG. 3 another method of providing a carrier gas with a known concentration of water vapor. The modification of FIG. 3 is basically in the catalytic reaction chamber 50, useable with either the method of FIG. 1B or FIG. 2. The chamber 50 is charged with a platinum-rhodium or other platinum group catalyst. The chamber 50 is provided with a heating device 52 such as a heating wire or heating tape connected by suitable conductors to an energy source 54 such as a generator or transformer. Between the source of energy 54 is a variable resistor 56 and ammeter 58 to control the electrical input to the heater and hence the temperature of the catalytic chamber 50. This heated catalytic chamber can be used with any combination of catalysts and/or gases that require heat to start or maintain the reaction.

With the reaction chamber 50 instead of using pure oxygen, an oxide such as nitrous oxide can be combined with hydrogen in the carrier gas to provide the proper water vapor content in the issuing gas stream shown as arrow 60 in FIG. 3. The carrier gas can be any gas that will not react wtih hydrogen or nitrous oxide. The platinum-rhodium catalyst heated to about 100° C. will cause the $H_2$ to react with the nitrous oxide to yield water vapor and nitrogen in the carrier gas (nitrogen). The amount of water vapor will be exactly equal to the oxygen in the nitrous oxide.

A third method can be employed to provide predetermined quantities of moisture in a carrier gas. With this method an amount of dry hydrogen equal to the quantity of water vapor desired, in the carrier gas is added to the carrier gas. This mixture is then passed over a suitable solid oxidizing agent such as supported copper oxide and water is formed. As stated before, the water content is equal to the initial hydrogen content. The CuO oxidizing agent can only be used for a limited time before it is reduced to the extent it is no longer effective. However, the CuO can be regenerated using oxygen. This method is particularly advantageous in that the carrier gas will contain only moisture with no residual hydrogen or oxygen. This method lends itself to both the embodiments described with reference to FIGS. 1B and 2 in that the gas mixture can be stored in high pressure cylinders or mixed in a continuous stream.

In certain cases it may be advantageous to combine the catalytic reaction method with the solid oxidizer method. To do this a mixture containing hydrogen in the concentration at which moisture is required, and oxygen in a concentration slightly less than required for complete reaction with the hydrogen, is passed over the required catalyst. The resulting mixture contains water vapor and a slight excess of hydrogen. Subsequent to catalytic reaction the mixture is passed over the solid oxidizer such as CuO or other suitable material to convert the remaining $H_2$ to H₂O. This method produces a carrier gas that is free of oxygen and hydrogen with the advantage that less frequent regeneration of the oxidizer is required.

The following examples will serve to illustrate the several novel features of our invention:

EXAMPLE I

A gas mixture is prepared containing 450 to 500 p.p.m. of oxygen and 0.5 to 1.0% (a substantial excess) of hydrogen in nitrogen in equipment as in FIG. 1A. This mixture is analyzed with an oxygen trace analyzer to determine the amount of oxygen which value was found to be 483±5 p.p.m. This gas mixture, when passed through a catalytic unit, as in FIG. 1B, over supported 0.5% palladium on kaolin catalyst, (such as Houdry "Nixox" catalyst) yields a gas having less than 1 p.p.m. of residual oxygen and 0.4 to 0.9% of residual hydrogen. The moisture content of the gas is 965±11 p.p.m. With varying amounts of oxygen in the gas mixture, the flow rate must be chosen such that all the oxygen is reacted.

EXAMPLE II

A gaseous mixture is prepared containing 900 to 1000 p.p.m. of hydrogen and 400 to 450 p.p.m. of oxygen in argon, with hydrogen in excess over the stoichiometric concentration. The mixture, from a storage cylinder as in FIG. 1A, on quantitative analysis by gas chromatography shows a content of 430±5 p.p.m. of oxygen and a hydrogen content of 940+10 p.p.m. The mixture is passed over a catalyst charged reactor as in FIG. 1B, then through a heated (to 200° C.) supported copper oxide reactant-catalyst bed as in FIG. 3. The gas leaving the catalyst reactor as in FIG. 1B and entering the copper oxide reactor as in FIG. 3 contains less than 1 p.p.m. of oxygen, 860±10 p.p.m. of water vapor and 80±20 p.p.m. of hydrogen in argon. Passage of the mixture through the copper oxide catalyst bed of FIG. 3 at up to 200° C. converts the remaining hydrogen to water, producing a gas with a moisture content of 939±10 p.p.m. of water and with both hydrogen and oxygen concentrations below 1 p.p.m.

Since copper oxide is a reactant as well as a catalyst in the above system, its activity will diminish with use and require replacement. This can be accomplished by periodic or continuous withdrawal of reduced copper oxide and replacement thereof with fresh copper oxide or periodic in place regeneration with nitrogen containing oxygen. An arrangement of two or more catalytic reactors in parallel can serve to provide at least one active catalyst bed to propagate the reaction while one or more parallel beds are being regenerated.

EXAMPLE III

A gaseous mixture is prepared containing 900 to 1000 p.p.m. of nitrous oxide and 0.5 to 1.0% of hydrogen as in FIG. 1A. This gas is analyzed quantitatively for nitrous oxide, (932±10 p.p.m.) by infra red analysis. On passage over a supported platinum-rhodium charged catalytic reactor as in FIG. 1B, at above 100° C., a gas having a water content of 931±10 p.p.m. is obtained, leaving a 0.4–0.9% of hydrogen in nitrogen carrier gas.

EXAMPLE IV

A gas reaction system as shown in FIG. 2 represents a continuous charging and supply unit in which accurately determined quantities of hydrogen and oxygen are introduced individually into an inert gas stream in close to stoichiometric ratio and mixed before contacting a supported palladium catalyst. The combined carrier stream contains 960±10 p.p.m. of hydrogen and 480±5 p.p.m. of oxygen respectively. The gas mixture, after passing over the catalyst bed is converted to a gas containing 959±11 p.p.m. of water vapor with a few p.p.m. of the reactant initially in excess.

The choice of method used will be determined by the mixture to be treated and by the continuous conditions under which the humidified gas is to be used. For example, if the gaseous product must be oxygen-free, then the method wherein oxygen is in excess, could not be used. If it were required to be oxygen and hydrogen free, then the methods of Example II or IV could be used.

In a process of the type herein described, in which highly accurate and sensitive gas analyses are a primary requirement, the most highly refined analytical methods are employed. Thus, the analysis for small amounts of oxygen in an inert gas such as nitrogen, as in Example 1, is made with a commercial oxygen trace analyzer of the type which is based on the hydrogenation of the oxygen to hydroxyl ion at the surface of a specially selected catalyst which forms one electrode of an electrochemical cell. The other electrode is a metal which can be oxidized in the electrolyte to provide electrons for the catalyzed reaction. The two electrodes are connected through an external load resistor with the magnitude of the current flow through this resistor directly proportional to the oxygen content of the gas flowed through the cell. The instrument range is from 0 to 1000 p.p.m. of oxygen, with more sensitive settings for specific concentration levels.

The analysis for hydrogen is made with a gas chromatograph in which the column is charged with five feet of molecular sieve type 5A, operating at a temperature of 40° C. and measuring hydrogen down to 1.0 p.p.m.

The analysis for nitrous oxide is made with a Beckman L.B. 215 nondispersive infrared spectrophotometer, which measures N₂O to below 1 p.p.m.

The process of the invention, however, is not dependent upon the use of these specific instruments and methods of analysis. Other techniques and instruments can be used provided only that their accuracy and sensitivity are at least in the range of the accuracy required for the moisture concentrations.

Although the cited examples are based on more difficult problems of minor amounts of water being produced quantitatively in situ in the range of 800 to 1000 p.p.m. or 0.08% to 0.1% by volume, the process is effective in producing gas mixtures containing substantially larger quantities of water, for example from 0.1 lb. of water per lb. of dry air to about 0.5 lb. of water per lb. of dry air.

Thus in space-cabin life support systems, pure hydrogen and oxygen could be reacted in a small catalyst unit to supply 0.02 lb. of water per lb. of dry air for a synthetic breathable atmosphere.

In a manner similar to the above examples, other inert or carrier gases may be mixed with hydrogen and reacted with oxygen, nitrous oxide, copper oxide and/or other oxidizing agents in situ to produce a controlled amount of water vapor. Inert gases other than nitrogen particularly suitable for such processing are argon, helium, krypton, neon, and xenon. In addition, hydrogen, oxygen, or nitrous oxide can act as the carrier gas as well as a reactant.

Other oxidizing gases, such as air, can be catalytically combined with a controlled amount of hydrogen in an inert gas body to produce a gas containing a known amount of water vapor.

If the mixture is to be made and stored in a high pressure gas cylinder, as in FIG. 1A, for a substantial period of time, nitrous oxide gas would be preferred as the oxidizing agent rather than oxygen in view of the lower reactivity of nitrous oxide with either the metal lining of the storage cylinder or the carrier gas present. It should be noted that at all times care must be taken to avoid producing explosive mixtures of the reactants.

Having thus described our invention by reference to several preferred embodiments we wish it understood that it is to be limited only by the scope of the appended claims.

We claim:

1. A method for producing a carrier gas with a predetermined amount of water vapor comprising the steps of: mixing the carrier gas to be humidified with a first component consisting essentially of hydrogen and a second component consisting essentially of oxygen, at least one of said components present in that molar concentration required to produce the molar concentration of water vapor desired and the other component present in at least stoichiometric quantity; and catalytically reacting said first and second components contained in the carrier gas to form water vapor.

2. A method according to claim 1 wherein the hydrogen is added in a molar concentration equal to the molar concentration of water vapor desired in the carrier gas and the oxygen is added in excess of the quantity required to completely react with the hydrogen.

3. A method according to claim 1 wherein the oxygen is added to produce a concentration equal to half of the molar concentration of water vapor desired in the carrier gas and the hydrogen is added in excess of the quantity required to completely react with the oxygen.

4. A method for producing a carrier gas with a predetermined amount of water vapor comprising the steps of:
mixing the carrier gas with a first component consisting essentially of hydrogen and a second component consisting essentially of an oxidizing gas selected from the group consisting of oxygen, air, nitrous oxide and mixtures thereof, at least one of said components being present in a molar concentration to provide that molar concentration of water vapor required in the carrier gas and the other component present in at least stoichiometric quantity; and
passing the mixture over a catalyst to react the components and form the desired water vapor.

5. A method according to claim 4 wherein the oxidizing gas is added in a molar concentration so that the molar concentration of available oxygen is equal to half the molar concentration of water vapor desired in the carrier gas and the hydrogen is added in excess of the quantity required to completely react with the oxygen.

6. A method for producing a controlled amount of water vapor in a gas comprising the steps of:
mixing the gas with a molar concentration of dry hydrogen equal to the molar concentration of water vapor desired in the gas, and a gaseous oxidizing agent selected from the group consisting of oxygen, air, nitrous oxide and mixtures thereof, the oxidizing agent being present in a quantity in excess of that needed to completely react with the hydrogen; and passing the mixture over a catalyst to react the components to form the desired water vapor.

7. A method for producing a gas with a controlled water vapor content comprising the steps of:
mixing the gas with a molar concentration of dry hydrogen equal to the molar concentration of water desired in the gas; and
contacting the mixture with a solid oxidizer comprising CuO at an elevated temperature to produce the desired water vapor in the gas.

8. A method for producing a carrier gas with a controlled water vapor content comprising the steps of:
mixing the carrier gas with a molar concentration of hydrogen equal to the molar concentration of water vapor desired in the gas;
adding to the mixture oxygen in an amount less than that required for complete reaction with the hydrogen;
exposing the oxygen, hydrogen and carrier gas mixture to a catalyst to produce a mixture of carrier gas water vapor, and an excess quantity of hydrogen; and, exposing the carrier gas, hydrogen, and water vapor mixture to a solid oxidizer comprising CuO to convert the excess hydrogen to water vapor.

9. A method for continuously humidifying a gas stream comprising the steps of:
introducing into the gas stream a first component consisting essentially of hydrogen and a second component consisting essentially of oxygen, at least one of said components present in that molar concentration required to produce the molar concentration of water vapor desired and the other component present in at least stoichiometric quantity; and
continuously exposing the mixture to a catalyst selected from the group consisting of platinum, palladium, rhodium, iridium and alloys thereof so as to react the hydrogen and oxygen to form water vapor in the gas.

10. The method of claim 9 wherein the hydrogen is added to the gas in a molar concentration equal to that molar concentration of water vapor to be introduced into the gas and the oxygen is present in excess.

11. A method of producing water vapor in a carrier gas as it is withdrawn from a storage receptacle comprising the steps of:
charging the receptacle with a mixture of the carrier gas, a first component consisting essentially of hydrogen and a second component consisting essentially of an oxidizing gas selected from the group consisting of oxygen, air, nitrous oxide and mixtures thereof at least one of the said components being present in that molar concentration necessary to produce the desired molar concentration of water vapor, and the other component being in at least stoichiometric quantity;
withdrawing the mixture from the storage receptacle and passing the mixture over a suitable catalyst to form water vapor in the carrier gas.

12. A method according to claim 11 wherein the hydrogen is present in the molar concentration required to form the desired molar concentration of water and the oxidizing gas is present in an excess amount and the catalyst is selected from the group consisting of platinum, rhodium, palladium, iridium and mixtures thereof.

References Cited

UNITED STATES PATENTS

| | | | |
|---|---|---|---|
| 1,358,619 | 11/1920 | Christensen | 23—147 |
| 2,863,729 | 12/1958 | McDuffie et al. | 23—204 |
| 2,874,030 | 2/1959 | Dennis | 23—2 |

OSCAR R. VERTIZ, Primary Examiner

H. S. MILLER, Assistant Examiner

U.S. Cl. X.R.

23—204 R; 252—472